(12) United States Patent
Vaidyanathan et al.

(10) Patent No.: US 11,120,503 B2
(45) Date of Patent: Sep. 14, 2021

(54) ANALYSIS AND VISUAL PRESENTATION OF DATASET COMPONENTS

(71) Applicant: Optimal Asset Management, Inc., Los Altos, CA (US)

(72) Inventors: Vijay Vaidyanathan, Los Altos, CA (US); Himanshu Monty Joshi, Los Altos, CA (US); Armand Aquino, Los Altos, CA (US); Alec Barlow, Los Altos, CA (US)

(73) Assignee: Optimal Asset Management, Inc., Los Altos, CA (US)

( * ) Notice: Subject to any disclaimer, the term of this patent is extended or adjusted under 35 U.S.C. 154(b) by 104 days.

(21) Appl. No.: 16/360,482

(22) Filed: Mar. 21, 2019

(65) Prior Publication Data

US 2019/0304019 A1 Oct. 3, 2019

Related U.S. Application Data

(60) Provisional application No. 62/619,838, filed on Jan. 21, 2018.

(51) Int. Cl.
*G06Q 40/06* (2012.01)
*G06F 3/0481* (2013.01)

(52) U.S. Cl.
CPC ......... *G06Q 40/06* (2013.01); *G06F 3/04817* (2013.01)

(58) Field of Classification Search
CPC ............................ G06Q 40/06; G06F 3/04817

(Continued)

(56) References Cited

U.S. PATENT DOCUMENTS 3,829,838 A 8/1974 Lewis et al.
5,021,976 A 6/1991 Wexilblat et al.
(Continued)

FOREIGN PATENT DOCUMENTS

WO WO 01/33402 5/2001

OTHER PUBLICATIONS

Kosara, Robert, "Presentation-Oriented Visualization Techniques", IEEE Computer Graphics and Applications, vol. 36, Issue 1, Jan. 14, 2016, pp. 80-85. (Year: 2016).*

(Continued)

*Primary Examiner* — Mohammad Z Shaikh
*Assistant Examiner* — George N. Proios
(74) *Attorney, Agent, or Firm* — Polsinelli LLP

(57) ABSTRACT

Methods and systems are disclosed for evaluating and visually displaying the performance of individual components of a portfolio of assets. Information regarding a portfolio may be received and parsed into individual components. The performance of each component may be evaluated by way of performance metrics and compared against corresponding alternative parts. A visual display may be generated that charts the performance of each component against replicability by the corresponding alternative component. Within such a display, each component may be represented by a respective icon, and the size of the icon may correspond to relative size (proportion) of the represented component within the portfolio. Each icon may also have different colors (and saturation thereof) to indicate different information (e.g., degrees of replicability, differences in performance metrics) regarding the represented component.

21 Claims, 7 Drawing Sheets

(58) Field of Classification Search
USPC .......................................................... 705/36
See application file for complete search history.

(56) References Cited

U.S. PATENT DOCUMENTS

| | | | |
|---|---|---|---|
| 5,041,992 A | 8/1991 | Cunningham et al. | |
| 5,675,746 A | 10/1997 | Marshall | |
| 5,799,287 A | 8/1998 | Dembo | |
| 5,893,079 A | 4/1999 | Cwener | |
| 5,911,045 A | 6/1999 | Leyba et al. | |
| 6,064,984 A | 5/2000 | Ferguson et al. | |
| 6,064,985 A | 5/2000 | Anderson | |
| 6,134,535 A | 10/2000 | Belzberg | |
| 6,484,152 B1 | 11/2002 | Robinson | |
| 6,839,686 B1 | 1/2005 | Galant | |
| 6,876,981 B1 | 4/2005 | Berckmans | |
| 7,383,219 B1 | 6/2008 | Jennings et al. | |
| 7,472,084 B2 | 12/2008 | Damschroder | |
| 7,689,501 B1 | 3/2010 | Gastineau et al. | |
| 7,756,769 B2 | 7/2010 | Haig | |
| 7,870,051 B1 | 1/2011 | En et al. | |
| 8,086,514 B2 | 12/2011 | Wallman | |
| 8,306,891 B1 | 11/2012 | Findlay et al. | |
| 8,370,243 B1 | 2/2013 | Cernyar | |
| 8,494,940 B1 | 7/2013 | Phillips et al. | |
| 8,577,775 B1 | 11/2013 | Gerber | |
| 8,629,872 B1 | 1/2014 | Phoa | |
| 8,635,141 B2 | 1/2014 | Zosin et al. | |
| 8,666,877 B2 | 3/2014 | Kumar et al. | |
| 8,732,059 B2 | 5/2014 | Fiala et al. | |
| 9,792,565 B2 | 10/2017 | Vogel et al. | |
| 2001/0025266 A1 | 9/2001 | Gastineau et al. | |
| 2002/0046145 A1 | 4/2002 | Ittai | |
| 2002/0095362 A1 | 7/2002 | Masand et al. | |
| 2002/0147671 A1* | 10/2002 | Sloan et al. | G06F 17/60 705/36 |
| 2003/0088492 A1 | 5/2003 | Damschroder | |
| 2003/0093352 A1* | 5/2003 | Muralidhar et al. | G06F 17/60 705/36 |
| 2003/0130923 A1 | 7/2003 | Charnley | |
| 2004/0049448 A1 | 3/2004 | Glickman | |
| 2005/0108134 A1 | 5/2005 | Harlow et al. | |
| 2005/0149424 A1 | 7/2005 | Weinberger | |
| 2006/0212376 A1 | 9/2006 | Snyder et al. | |
| 2007/0112662 A1 | 5/2007 | Kumar | |
| 2007/0299785 A1 | 9/2007 | Tullberg | |
| 2008/0040250 A1 | 2/2008 | Salter | |
| 2008/0071702 A1 | 3/2008 | Howard et al. | |
| 2008/0243716 A1 | 10/2008 | Oiumet et al. | |
| 2009/0048958 A1 | 2/2009 | Gardner et al. | |
| 2009/0292648 A1 | 11/2009 | Damschroder et al. | |
| 2009/0327155 A1 | 12/2009 | Dial et al. | |
| 2010/0217725 A1 | 8/2010 | Clyne et al. | |
| 2010/0235299 A1 | 9/2010 | Considine | |
| 2010/0325062 A1 | 12/2010 | O'Shaughnessy et al. | |
| 2010/0332410 A1 | 12/2010 | Brown et al. | |
| 2011/0184884 A1 | 7/2011 | Lyons et al. | |
| 2011/0251978 A1 | 10/2011 | Davies et al. | |
| 2011/0270780 A1 | 11/2011 | Davies et al. | |
| 2012/0078810 A1 | 3/2012 | McGrath | |
| 2012/0116994 A1 | 5/2012 | Michaud et al. | |
| 2012/0116996 A1 | 5/2012 | Varma et al. | |
| 2012/0246094 A1 | 9/2012 | Hsu et al. | |
| 2013/0024395 A1 | 1/2013 | Clark et al. | |
| 2013/0041848 A1 | 2/2013 | Stubbs et al. | |
| 2013/0066802 A1 | 3/2013 | Sheldon | |
| 2014/0258175 A1 | 9/2014 | Twombly et al. | |
| 2014/0279693 A1 | 9/2014 | Roy et al. | |
| 2014/0317019 A1 | 10/2014 | Papenbrock et al. | |
| 2014/0365400 A1* | 12/2014 | Fiala et al. | G06Q 40/06 |
| 2015/0081592 A1 | 3/2015 | Stubbs et al. | |
| 2015/0154706 A1* | 6/2015 | Wakeman | G06Q 40/06 |
| 2015/0324914 A1 | 11/2015 | Zhan et al. | |
| 2015/0324919 A1 | 11/2015 | Riggs et al. | |
| 2016/0035032 A1 | 2/2016 | Twombly et al. | |
| 2016/0086278 A1 | 3/2016 | Renshaw | |
| 2016/0098796 A1 | 4/2016 | Jeet et al. | |
| 2016/0239918 A1 | 8/2016 | Lambur et al. | |
| 2016/0343078 A1* | 11/2016 | Vaidyanathan et al. | G06Q 40/06 |
| 2016/0343079 A1 | 11/2016 | Vaidyanathan | |
| 2017/0011121 A1* | 1/2017 | Martin | G06F 30/0625 |
| 2017/0024819 A1* | 1/2017 | Miles et al. | G06Q 40/06 |
| 2019/0164225 A1* | 5/2019 | Van Erlach | G06Q 40/06 |
| 2020/0250760 A1 | 8/2020 | Vaidyanathan | |
| 2020/0410595 A1 | 12/2020 | Vaidyanathan | |

OTHER PUBLICATIONS

Jurczenko, E., Michel, T., Teiletche, J., "Generalized-Risk-Based Investing", Journal of Investment Strategies.
Mesomeris, S., "Risk Premia In Asset Allocation", CFA UK Annual Conference, Jun. 20, 2013.
U.S. Appl. No. 14/716,843 Final Office Action dated Nov. 27, 2019.
U.S. Appl. No. 14/716,843 Office Action dated Jun. 18, 2019.
U.S. Appl. No. 14/716,843 Final Office Action dated May 23, 2018.
U.S. Appl. No. 14/716,843 Office Action dated Sep. 20, 2017.
U.S. Appl. No. 14/715,568 Final Office Action dated Aug. 6, 2019.
U.S. Appl. No. 14/715,568 Office Action dated Dec. 10, 2018.
U.S. Appl. No. 14/715,568 Final Office Action dated Jan. 10, 2018.
U.S. Appl. No. 14/715,568 Office Action dated Aug. 7, 2018.

* cited by examiner

FIG. 2B

ANALYSIS AND VISUAL PRESENTATION OF DATASET COMPONENTS

CROSS-REFERENCE TO RELATED APPLICATIONS

The present patent application claims the priority benefit of U.S. patent application No. 62/619,838 filed Jan. 21, 2018, the disclosure of which is incorporated by reference herein.

BACKGROUND OF THE INVENTION

1. Field of the Invention

The invention relates to evaluating the performance of a portfolio's components. More specifically, the invention relates to examining portfolio component performance, as well as replacing an underperforming portfolio component with a higher performing suggested portfolio component while preserving the essential risk factor profile of the portfolio as a whole.

2. Description of the Related Art

Portfolio managers at financial institutions manage numerous client portfolios. One of the ways a portfolio manager adds value to a portfolio in service of their clients is by monitoring their portfolios (each comprising a set of components, such as stocks and other securities) and evaluating performance on a regular basis. If the portfolio is under-performing, the goal would be to replace all or a portion thereof with alternative components. However, determining which portion of a portfolio results in under-performance (and to what extent) can be difficult as there may be numerous components, each having a different effect. As such, monitoring a portfolio on a regular basis can be time-consuming and difficult to do consistently. Further, determining proper metrics to evaluate the value-add in performance of individual components can be challenging.

In addition, even when numerous metrics are available, the problem becomes how to identify which metrics are relevant to and indicative of performance and of effect on the whole portfolio. Furthermore, a report that expresses such metrics in textual and/or numeric form can be extremely dense and opaque for a person (especially clients) to grasp readily or to easily perform apples-to-apples comparisons across a variety of different metrics.

As such, there is a need in the art for improved systems and methods that allow for portfolio analysis on an individual component basis and visual presentation of the same.

SUMMARY OF THE INVENTION

Embodiments of the present invention may include a computer-implemented method for accessing portfolio performance information, evaluating on an individual basis each portfolio component, filtering for relevance to overall portfolio performance, swapping out the portfolio component (e.g., with a better-performing portfolio component), or placing the same on a watch list. Such methods may filter for relevance based on automatically identifying components of a portfolio to be replaced. Once identified, the methods may further including identifying and suggesting alternative components that have the potential to outperform while preserving the overall composition and balance of the portfolio.

For each imported portfolio, a visual display of the analytical results may be generated on a graphical user interface. Such visual display may include the extracted and filtered subset of metrics regarding each of the imported portfolio components identified as having at least a minimum threshold level of effect on overall portfolio performance. Such metrics can be directed at measuring such risk factors as value, momentum, volatility, or other commonly-used factors.

Further embodiments provided that for each portfolio imported, a matching target blend for each portfolio component—based on matching the equivalent factor exposures, a process called premia factor fit (PFF)—may be constructed. Such a target blend may be constructed based on metrics from the imported portfolio to identify candidate components for replacement. In addition, imported information regarding a target risk factor profile may be used to generate a matching PFF portfolio, which may be stored in a database. The component(s) identified as corresponding to the target PFF portfolio may also be evaluated for performance, value, and replicability metrics against the corresponding parts of the underperforming portfolio. In one embodiment, the user may provide a target threshold or percentage of matching (e.g., as a measure of confidence that is met) for each component suggested for inclusion in the target PFF portfolio blend as a suitable alternative to the corresponding component being replaced.

Where multiple portfolio components are being evaluated for each portfolio, the generated visual display may identify one or more underperforming portfolio components. The visual display may further include suggestions or options (e.g., based on a previously constructed target PFF portfolio blend) for making changes so as to more closely match the overall composition of the underperforming portfolio while improving efficiency of performance by the individual components.

The visual display may therefore provide options for replacing or swapping the underperforming portfolio component with an alternative component corresponding to the target PFF portfolio blend or placing the underperforming portfolio component on a watch list for subsequent swaps.

In one embodiment, the user (or an automated system using previously provided user input) may replace the underperforming portfolio component with the alternative that corresponds to the matching PFF portfolio blend when the matching threshold is met. The replacement may result in selling the underperforming component asset from the current portfolio and purchasing a different component asset corresponding to the target PFF portfolio blend.

In another embodiment, the different component corresponding to the target PFF portfolio blend may be placed on a watch list. In this instance, the user may easily identify and track the performance of an underperforming portfolio compared against its target PFF as reflected by updated data, and subsequently implement the swap of the component corresponding to the target PFF portfolio blend from the database in place of the underperforming portfolio component.

BRIEF DESCRIPTION OF THE DRAWINGS

FIG. 2B is a table of data regarding proposed alternative components corresponding to a target portfolio blend according to the disclosed embodiments.

DETAILED DESCRIPTION

Figure 1:
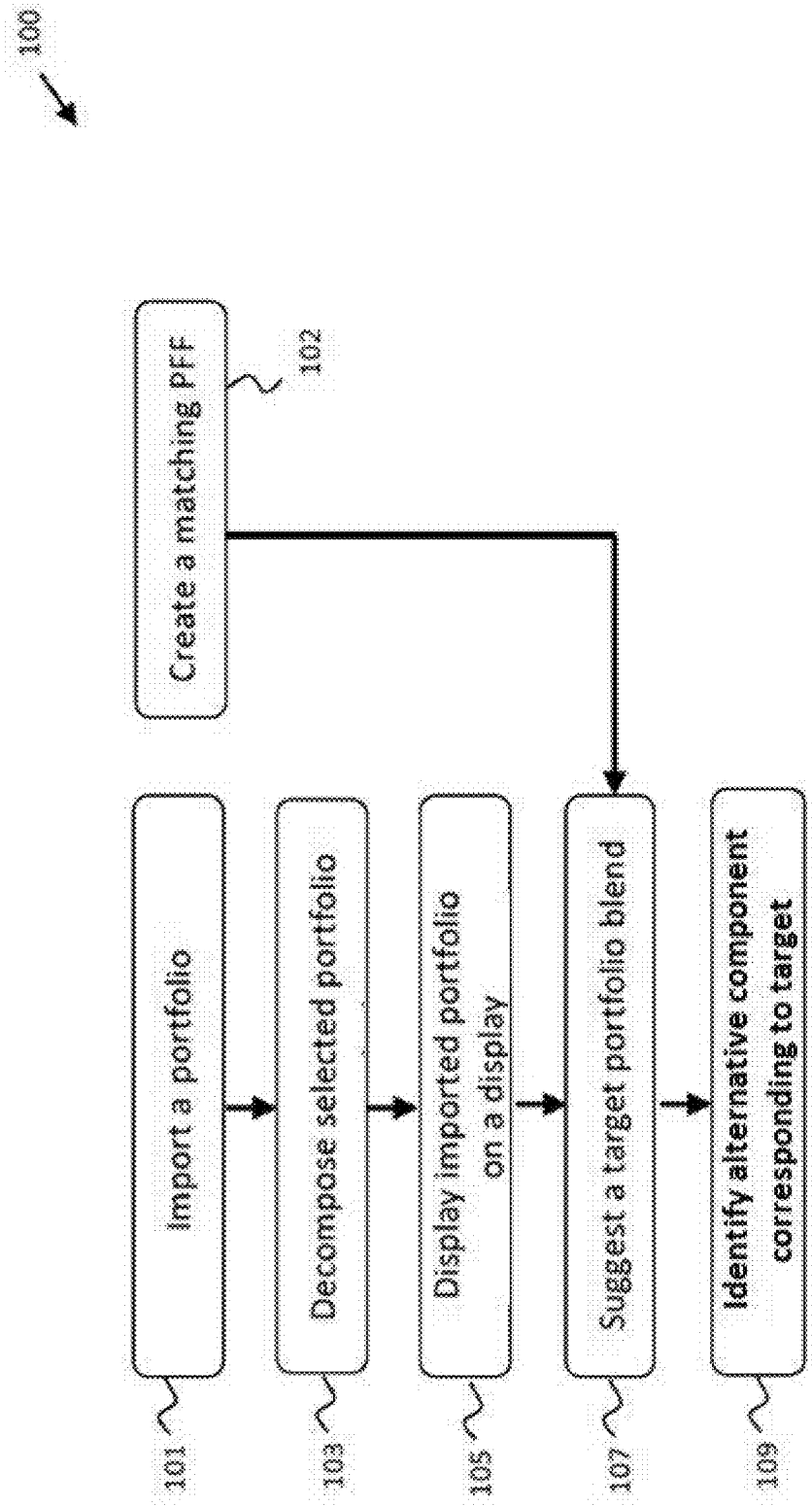
FIG. 1 is a flow chart illustrating an exemplary method for analyzing the performance of an existing portfolio against a target portfolio blend according to the disclosed embodiments.

FIG. 1 is a flow chart illustrating an exemplary method for analyzing the performance of an existing portfolio against a target portfolio blend according to the disclosed embodiments.

In step 101, a model (or group of portfolio components) associated with a portfolio may be imported into a user interface (e.g., Factor Allocator Interface) of a computing device. The imported model may consist of a variety of assets, such as mutual funds, stocks, and other types of publicly and privately traded equity funds and securities.

Figure 3:
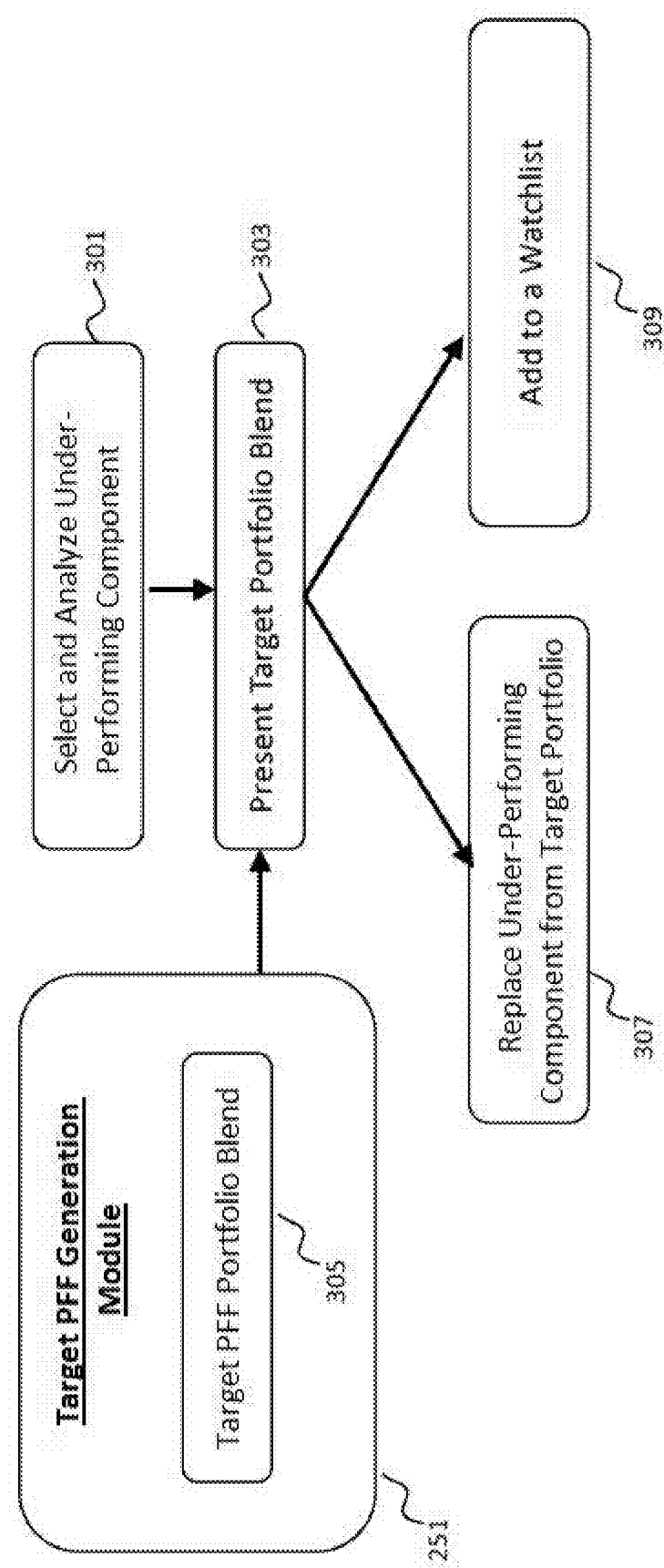
FIG. 3 is a flowchart illustrating an exemplary method of swapping a component of an existing portfolio with an alternative component corresponding to the target portfolio blend according to the disclosed embodiments.

In step 102, a target portfolio blend may be constructed for the portfolio imported into the Factor Allocator Interface. The target portfolio, also referred to as the Premia Factor Fit (or PFF), may be created based on examination of each component of the imported portfolio and mix thereof with respect to a set of predetermined risk factors. The created target PFF portfolio may represent the closest match to the uploaded portfolio in accordance with the set of predetermined risk factors and may be saved to a database. FIG. 3 provides additional details on how the target PFF portfolio may be constructed, a process which may be performed automatically or on-demand. The target portfolio blend may therefore represent a desired composition of risk exposures that have been identified for a particular portfolio. Different components (e.g., stocks and other securities) may be chosen for a portfolio in order to achieve the desired blend. However, a specific component may fit the desired profile, but be underperforming (e.g., inefficient, associated with additional fees and costs) relative to another component that also fits the profile. In various embodiments, various available components may be continually updated and refined based on updated data to identify how closely such components correspond to different aspects of the target portfolio blend. Such components may serve as points of comparison and refined to identify a pool of candidates for replacing existing components of an analyzed portfolio.

In step 103, the imported portfolio may be decomposed into its components, and the performance of each component may be evaluated based on a predetermined mix of risk factor metrics. For example, the risk factor metrics may be based on measuring selected parameters relating to value, momentum, quality, and volatility. In other embodiments, different risk factor metrics may be selected and applied via the interface to the imported portfolio. These risk factor metrics can be developed by the provider of the interface, third parties, or provided by the user (e.g., by way of direct input, upload/download, selection from a menu of options, etc.).

In step 105, the portfolio may be displayed on an X-Y scatter plot that charts the performance metrics of each component. Each component may be represented by an icon in the plot, and the position of each icon along the X-axis may be established by an analysis of the respective performance metrics identified in step 103. In the graphical user interface (also known as The Factor Allocator Interface) illustrated in FIG. 2A, each portfolio component is depicted as a colored circle. The size of the circle may represent the size (e.g., monetary amount) of the component within the larger model, and the color may represent the strength and relative performance of the component within the model. For example, a larger circle may be used for a component that has a larger monetary value, and a smaller circle may be used for a relatively smaller component. Alternatively, other shapes—such as squares, rectangles, etc.—may also be used instead of circles to depict portfolio size, performance, strength or other characteristics as desired.

Figure 2A:
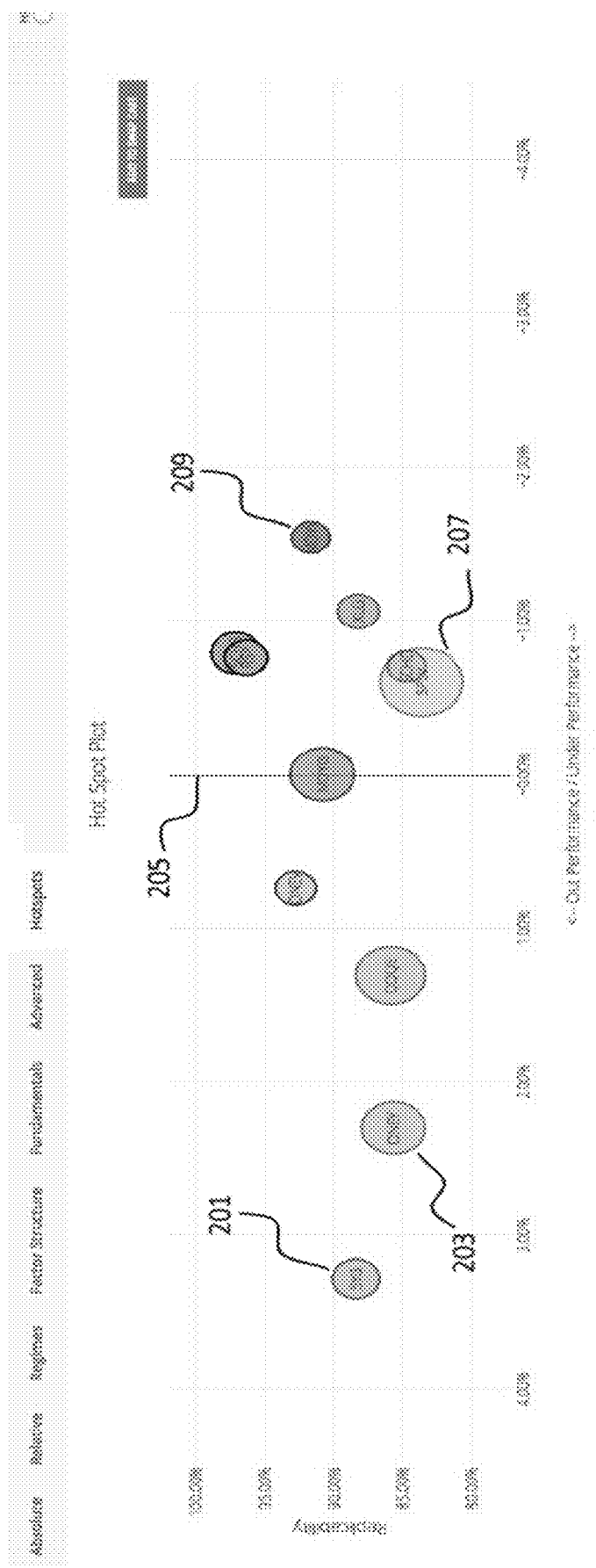
FIG. 2A illustrates an exemplary graphical representation of multiple portfolio components that may be generated according to the disclosed embodiments.

In addition, FIG. 2A also illustrates that the color spectrum can range from green to red, where a high-performing component is colored in green and an underperforming component is colored in red. Other color schemes, shading schemes, and hashing schemes may also be used to show the spectrum from underperforming to high-performing portfolios. The display may also include other portfolios from the same or other models that are managed by the same portfolio manager.

In step 107, a target portfolio blend may be suggested. As mentioned earlier, the Factor Allocator Interface may examine each portfolio component against Premia Factor Fit (PFF) portfolio blends in terms of historical value-add and correlation to the PFF. Such comparisons (e.g., of a specific component in the imported portfolio against one or more corresponding components of the target portfolio blend) may determine if the target portfolio blend that represents the PFF may provide a suitable replacement for an underperforming component while maintaining an overall composition that corresponds inter alia to a desired risk factor profile.

The Factor Allocator Interface may suggest a specific mix of portfolio components identified from the target portfolio blend to replace one or more components in the existing portfolio. The components of the target PFF portfolio blend may be identified based on a mix of factors (e.g., x % Value, y % Low Volatility, z % Momentum) and may be adjusted dynamically over time. Components corresponding to the target PFF portfolio blend may be identified based on closely matching the predetermined factor mix of the current portfolio, and a component from the target PFF portfolio blend may be selected to replace a corresponding component based on stronger historical performance. The interface may define a match or replicability probability to evaluate how close of a match the alternative component is to the component being replaced. For example, the interface may be set a minimum threshold of 80% replicability in order for a component to be considered as a candidate to replace an underperforming component within this framework of analysis. Other percentage thresholds can be employed. Further details of selection of the target PFF portfolio blend is described in relation to FIG. 2B.

In step 109, one current component may be identified as underperforming and replaced with an alternative component selected from the target portfolio blend. Such alternative component may have been identified as one that matches most closely in terms of risk factors to the current component, but with higher historical performance. As such, the overall portfolio may continue to reflect the same predetermined composition of reference factors, but with higher-performing component(s). The replacement may result in several actions being performed, such as capital from the current portfolio being withdrawn and used to purchase the identified alternative component in the given proportions, or simply that the current component and alternative component corresponding to the target blend may be maintained in a table (or watch list) for future assessment. Updates on that assessment based on new data can be made and may be used to trigger subsequent automatic actions (e.g., sale of one component, purchase of an alternative component).

FIG. 2A illustrates an exemplary graphical representation of multiple portfolio components that may be generated according to the disclosed embodiments. As mentioned in relation to FIG. 1, a portfolio's components may be graphically represented on a graphical user interface. The graphical depiction of the portfolio allows a user to quickly determine the size, factor replicability, and factor-relative performance of the individual components of the portfolio.

The chart of FIG. 2A represents a plurality of portfolio components. Such components may be drawn from one or more selected portfolios associated with a portfolio manager, their institution, third parties, or otherwise accessible. Such portfolio(s) may be imported into a database via an interface (e.g., Factor Allocator Interface), so as to generate a visual breakdown of all relevant holdings in terms of a predetermined mix of risk factors.

In the illustrated embodiment, portfolios may be depicted by an icon—such as a circle or other shape—of a certain size. The size of the circles may represent the proportional size of the component (e.g., amount or percentage of total amount) within the overall portfolio.

Further, each component in the portfolio may also be color-coded. In the illustrated chart, the color scheme may reflect which components are performing well (e.g., in relation to historical averages) and which components are under-performing. In addition, the Factor Allocator Interface may also places the circle icons along the Y-axis based on their replicability (by a corresponding alternative component from the target PFF blend) and along the X-axis based on performance (against its corresponding alternative component from the target PFF blend).

As illustrated, component 201 (depicted as a smaller circle as compared to component 203) can be visually indicated as proportionally smaller, but having better-performance (against its corresponding alternative) and a higher replicability (by its corresponding alternative) than component 203 (against its respective alternative component). Likewise, component 209, which is represented by a smaller icon than that of component 201 and 203, is placed in the far-right side of the X-axis (e.g., the performance axis). The icon for component 209 is also colored red, signifying that it is the worst-performing component compared to other components in the portfolio. Component 207 is illustrated as the largest circle on the dashboard, signifying a proportionally larger investment than other component. Component 207 is also illustrated as red and further to the right along the X-axis, indicating that component 207 is underperforming in comparison to alternative component(s) corresponding to a target portfolio blend.

The components to the left of the neutral line 205 are considered to be performing better than their respective alternative components, and the components to the right side of the neutral line 205 are considered as underperforming in comparison to their respective alternative components.

Figure 2B:
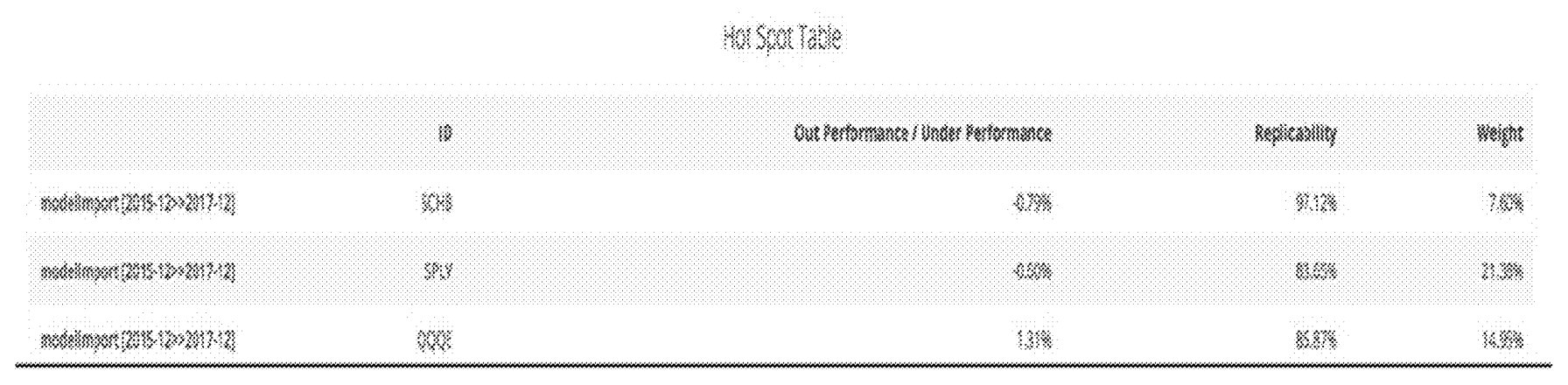

FIG. 2B is a table of data regarding proposed alternative components corresponding to a target portfolio blend according to the disclosed embodiments. Such a table may serve as a watch list, reflecting candidates that have been flagged for use in replacing a corresponding component in a current portfolio. As illustrated, the table pertains to three different components of a portfolio, their comparative performance (against their respective alternative component), replicability, and weight.

The replicability metric—which corresponds to the Y-axis in the chart of FIG. 2A—indicates how closely the alternative component would replicate the role (e.g., used to meet different factors and goals) of the component being replaced within the overall composition of the portfolio. A high replicability metric therefore indicates that the alternative component is likely capable of serving very similar functions in the composition of the portfolio, while a low replicability metric indicates the alternative component is unlikely to serve the same functions. In the chart of FIG. 2A, the portfolio components have been filtered such that only components having at least a threshold (e.g., 80%) replicability are included.

Weight—which corresponds to the size of the icons in the chart of FIG. 2A—refers to a proportion (e.g., size, monetary amount) represented by a component within a portfolio. A more heavily weighted component has more effect on the over performance of the portfolio—and replacing the same would have more significant effect—than a less heavily weighted component.

Figure 2C:
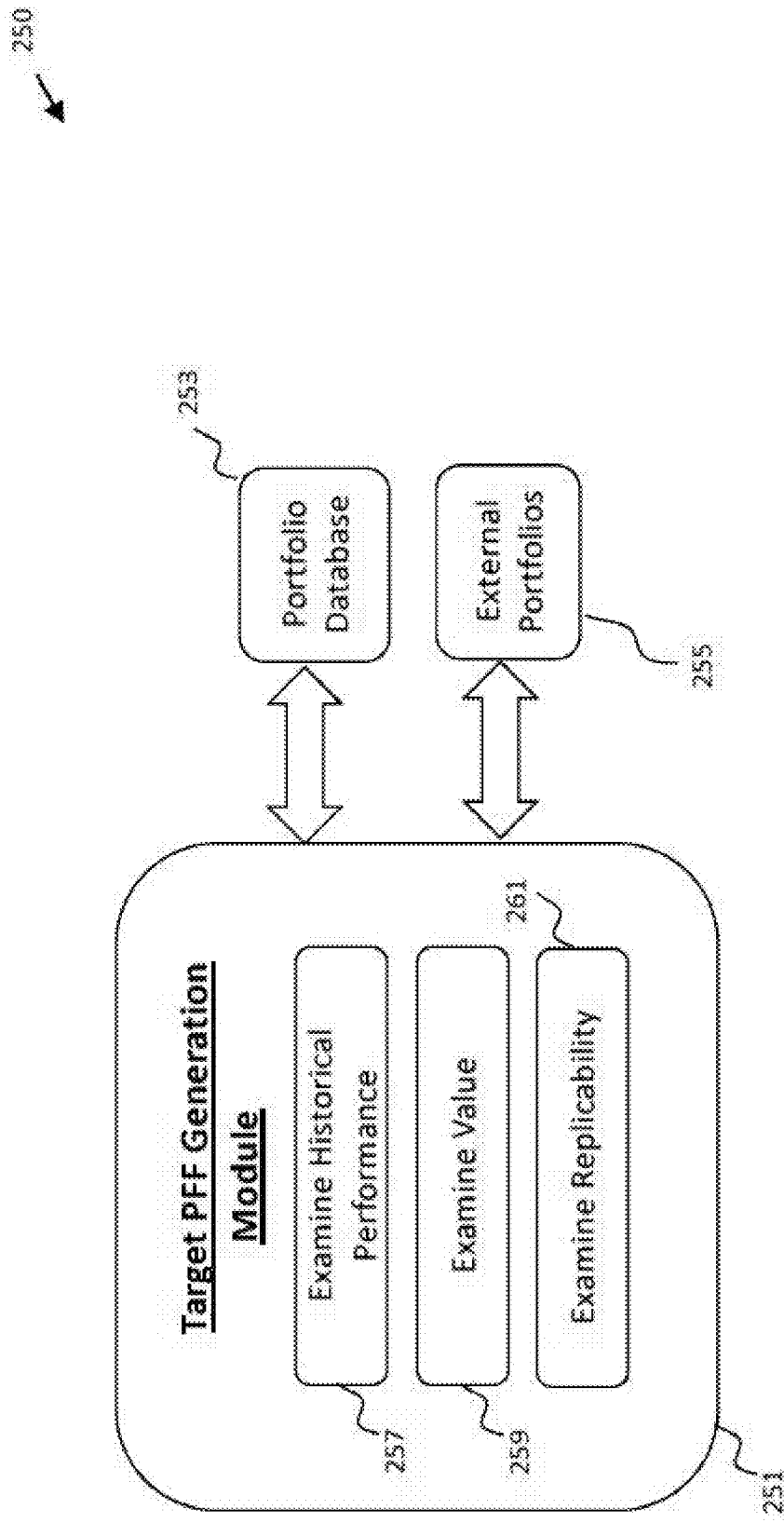
FIG. 2C is a diagram illustrating different types of information used to identify a target portfolio blend.

FIG. 2C is a diagram illustrating different types of information used to identify a target portfolio blend. As mentioned earlier, a target PFF portfolio may be constructed for each portfolio that is imported into the Factor Allocator Interface. In one embodiment, a target PFF portfolio may be created within a certain time frame of importing the portfolio. The time frame may vary. For example, the target PFF portfolio may be created automatically in real-time (e.g., instantly based on a current set of data) or based data gathered over a user-defined time frame. One of the goals of creating a target PFF portfolio is to monitor the performance of the imported portfolio against the target PFF portfolio. Yet another goal may be to have a target PFF portfolio that matches the imported portfolio be readily available in the event one or more components of the imported portfolio need to be swapped for a corresponding alternative identified from the target PFF portfolio. In addition, an institution may also use PFF metrics to determine whether a portfolio manager's portfolio is meeting or exceeding the PFF returns, i.e. the returns realized by a PFF portfolio.

In operation, the target PFF portfolio may be created by a target PFF generation module 251. The portfolio generation module 251 accesses a portfolio database 253, which may include a plurality of different portfolios (and components) that are within the available universe of consideration (e.g., by the institution). The portfolio components may be evaluated individually or as a blend in the Factor Allocator Interface. The returns observed by the premia factor portfolios may be called the Premia Factor Fit (PFF) portfolio. The goal of a PFF is to act as a custom factor benchmark that is specific to each portfolio component. The portfolio generation module 251 may also access other external portfolios 255 that are outside the institution or the database and constructed by third parties (e.g., available for search and retrieval using the Internet). The portfolio generation module 251 examines the target portfolio blend that is obtained either from the portfolio database 253 or an external portfolio 255 against a plurality of criterion.

For example, the portfolio generation module 251 may examine the target portfolio blend against historical performance 257, value 259, and replicability 261. Other criteria may also be established by the user or automatically generated for examination.

Once the portfolio generation module 251 examines the imported portfolio based on the predetermined criteria (e.g., the above-mentioned criteria, user-defined criteria, or automated criteria), a systematic rebalancing rule may be applied on the closest-mix factor weights, and the underlying portfolios that represent the blend may therefore change at each rebalance period.

FIG. 3 is a flowchart illustrating an exemplary method of swapping a component of an existing portfolio with an alternative component corresponding to the target portfolio blend according to the disclosed embodiments.

In step 301, an underperforming portfolio is selected. The underperforming portfolio may be one of many portfolios managed by an institution or a portfolio manager or part of a database of portfolios. The user may have defined a threshold (e.g., underperformance by 2%) to select the current portfolio for adjustment. The components of the selected portfolio may be individually analyzed to identify a set of at least one underperforming component (in comparison to corresponding alternative components having similar composition profiles).

Once selected, the underperforming component is analyzed to extract all relevant metrics required to understand its composition and risk premia. For example, the component may be analyzed to determine the factor blend for the portfolio, including value, quality, momentum, and volatility exposure, and other risk premia factors. The goal for extracting these metrics is for use in finding a comparable portfolio with similar metrics that has performed better than the existing portfolio, thereby indicating the potential to do so in the future as well (the PFF).

In step 303, a matching PFF portfolio blend that approximates each current portfolio component is presented. As mentioned earlier and described in FIG. 1, a target PFF portfolio blend may be created around the time the portfolio was imported. As such, a target PFF portfolio blend that has been previously created, and an alternative component therefrom may be previously determined to be a suitable replacement (e.g., meeting replicability threshold) for the specific underperforming component may be made readily available for comparison, visual presentation, and (upon approval) replacement.

In step 303, the target PFF portfolio blend is presented. At this point, the user has the option to either go to step 307 to replace the underperforming component with the identified alternative component. Alternatively, the user may elect to proceed to step 309, where the alternative component is added to a watch list in a database. In some embodiments, the user may further specify triggers whereby the underperforming component is automatically replaced when certain conditions (e.g., timing, performance) are met.

If a swap is made, such a swap may include selling of the underperforming component in the current portfolio and buying the alternative component corresponding to the target PFF portfolio blend. The swap may also result in other actions, such as obtaining funds, transferring funds form a bank, and purchasing an additional component without a corresponding sale of an underperforming component. Alternatively, the underperforming component, as well as the respective target PFF portfolio blend, can be maintained on a "watch list" for further evaluation.

Figure 4:
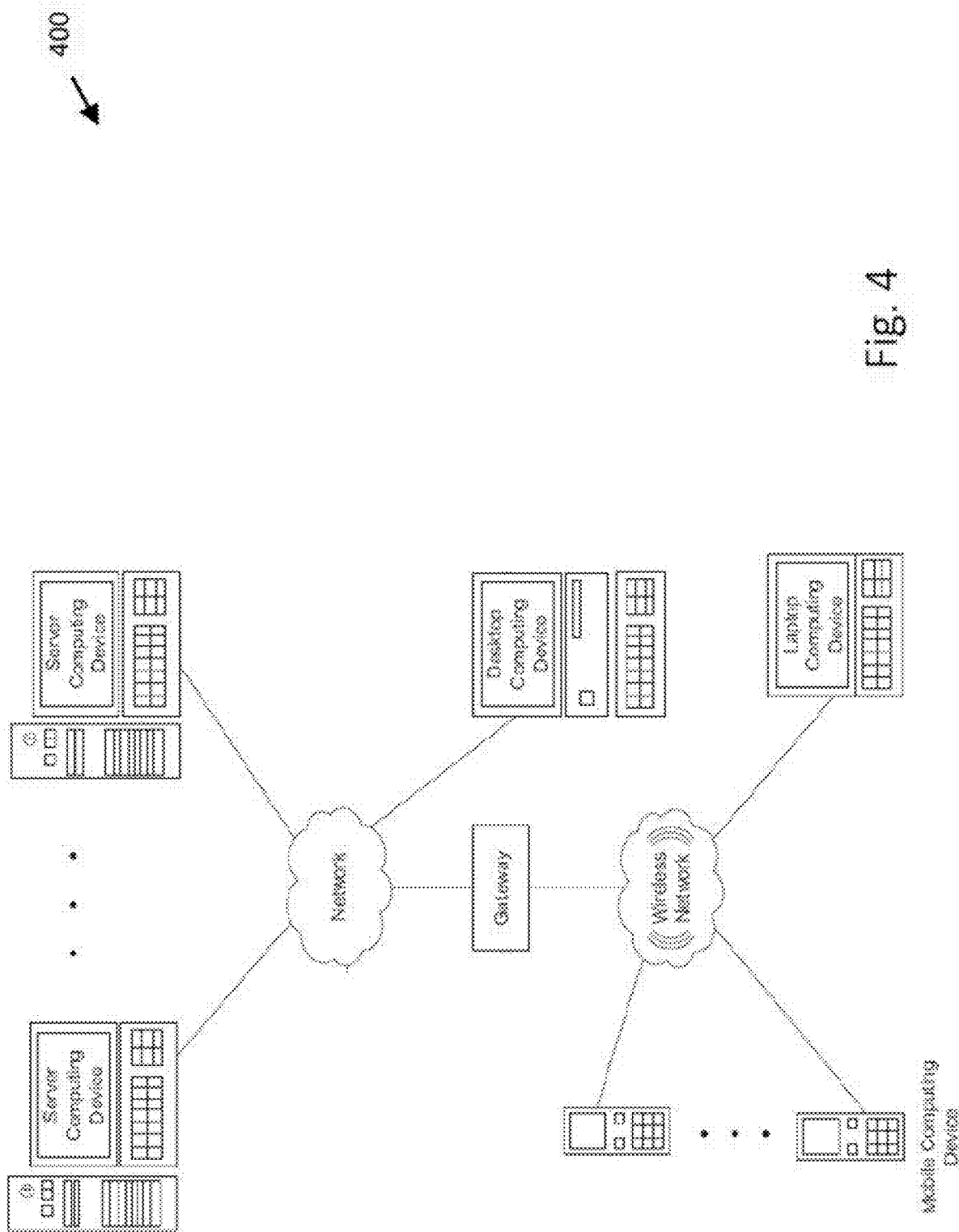
FIG. 4 illustrates an exemplary network environment in which a system for evaluating portfolio components and generating a visual display may be implemented according to the disclosed embodiments.

FIG. 4 illustrates an exemplary network environment in which a system for evaluating portfolio component parts and generating a visual display may be implemented according to the disclosed embodiments. Other components may be included in system 400 not shown in FIG. 4. System 400 may include local area networks (LAN) and wide area network (WAN) shown as network and wireless network. Client computing devices may include any device capable of receiving and sending data over a network, such as wireless network. Devices may include portable devices such as cellular telephones, smart phones, radio frequency-enabled devices, personal digital assistants, handheld computers, tablets, laptop computers, wearable computers and the like. Devices also may include any computing device that connects to a network using a wired communications medium such as personal computers, multiprocessor systems, microprocessor-based or programmable consumer electronics, network personal computers and the like.

Client computing devices also may include at least one other client application that is configured to receive content from another computing device, including, without limit, server computing devices. Server also comprises server app and database.

Network is configured to couple one or more servers computing devices and their respective components with other computing devices, such as client device, and through wireless network to client devices.

Figure 5:
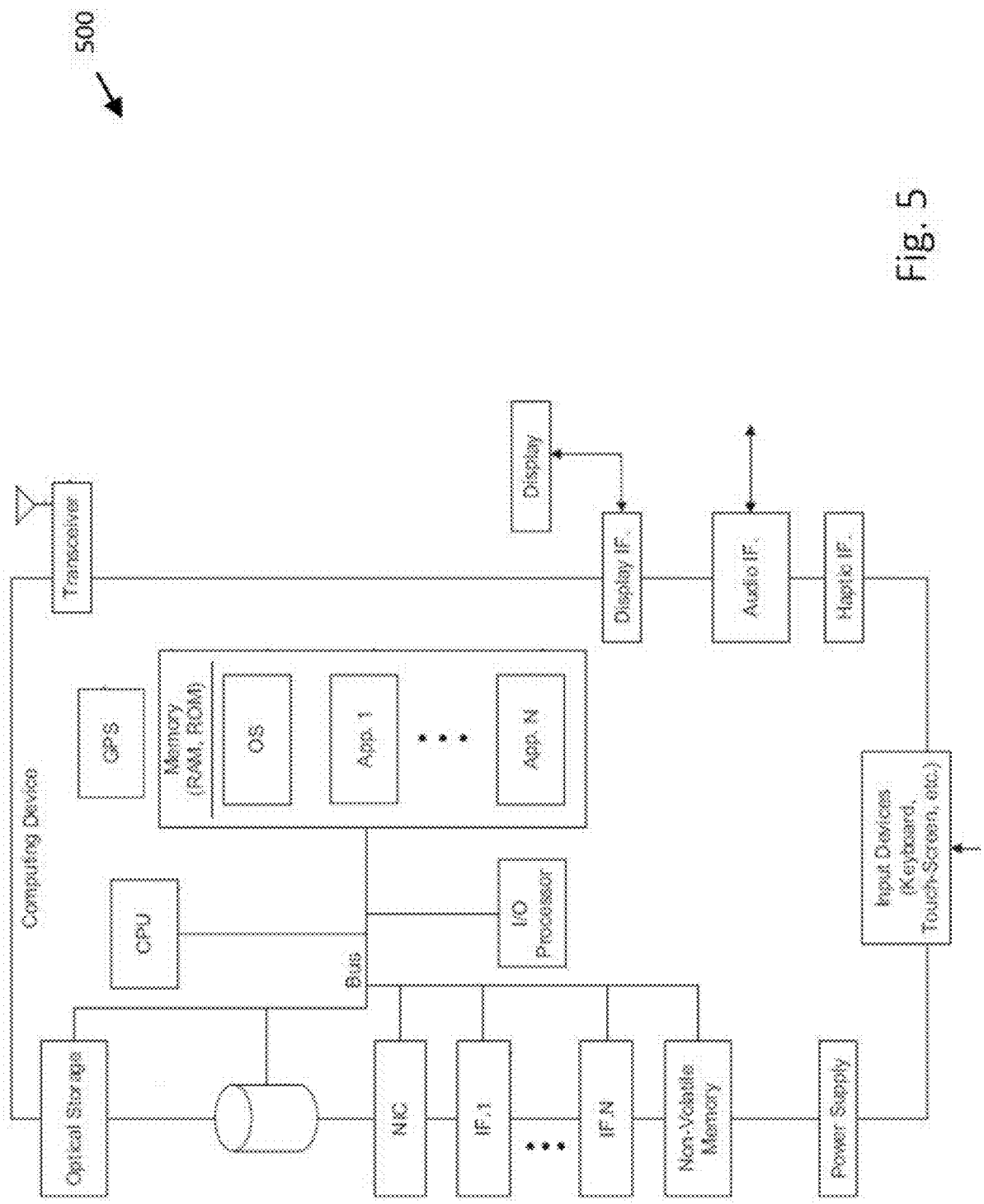
FIG. 5 illustrates an exemplary computing device that may be used to evaluated portfolio components and to generate a visual display according to the disclosed embodiments.

FIG. 5 illustrates an exemplary computing device that may be used to evaluated portfolio components and to generate a visual display according to the disclosed embodiments. Computing device 500 communicates with other devices over system 400 to perform the functions needed for generating, managing, and replacing one or more portfolios. Computing device 500 includes optical storage, central processing unit (CPU), memory module, display interface, input devices, input/output (I/O) processor, bus, non-volatile memory, network interface card (NIC), hard disk, power supply, and a transceiver. Computing device 500 is configured to be a special purpose device for generating, managing, and replacing a plurality of portfolio and performing disclosed steps in figures above.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description.

It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for visually displaying comparisons of dataset components, the method comprising:
   receiving imported information via a user interface regarding a dataset comprising a plurality of components, each component corresponding to a data subset that includes function data and historic data;
   searching one or more databases accessible over a communication network, wherein database search results include at least one alternative component for each component of the dataset based on the function data, wherein each alternative component is associated with a replicability metric based on an identified similarity of function data to the function data of the respective component of the dataset;
   filtering the components based on a replicability metric threshold, wherein one or more of the components having a replicability metric below the replicability metric threshold are excluded from further analysis;
   identifying at least one location along a first axis based on the filtered components;
   identifying at least one location along a second axis by generating a historic metric for each of the filtered components, wherein the historic metric is based on a comparison of historic data of the respective filtered component against historic data of the at least one identified alternative component, and wherein the at least one location along the second axis is based on the historic metric; and
   generating a visual display within a graphical user interface of a display screen, wherein the visual display charts the historic metric of each of the filtered components against the replicability metric of each of filtered components, the visual display including an icon corresponding to each filtered component and plotted at the at least one location along the first axis and the at least one location along the second axis, wherein a size of the icon corresponds to a size associated with the respective filtered component relative to a size associated with the dataset, and wherein the filtered components having a replicability metric above the replicability metric threshold are illustrated in the visual display in accordance with the filtering.

2. The method of claim 1, further comprising identifying a component among the plurality of components to replace based on a location of the corresponding icon within the visual display, wherein the visual display includes an option to replace the identified component.

3. The method of claim 2, further comprising making a suggestion regarding replacement of the identified component based on a corresponding alternative component among the database search results.

4. The method of claim 3, further comprising extracting a plurality of metrics regarding the dataset, and constructing a new dataset that matches the extracted plurality of metrics regarding the historic data and replicability of the function data.

5. The method of claim 3, further comprising receiving input electing the option to replace the identified component with the alternative component, wherein implementing the elected replacement comprises automatically replacing the identified component with the alternative component in accordance with the received input.

6. The method of claim 3, wherein the visual display includes an option to place the identified component on a watch list, and further comprising receiving input electing the option to add an alternative component to the identified component to the watch list.

7. The method of claim 6, further comprising storing a trigger specifying one or more conditions for replacing the identified component with the added alternative component on the watch list, and automatically initiating the replacement when the specified conditions are identified as having been met.

8. The method of claim 7, wherein the trigger is specified by a user.

9. The method of claim 1, wherein the database search results include data obtained in real-time.

10. The method of claim 1, wherein database search results include data obtained within a time frame defined by a user.

11. The method of claim 1, wherein a color of the icon is selected from a predetermined color spectrum across a range of one or more colors, the range of the predetermined color spectrum corresponding to the first axis or the second axis, and further comprising selecting the color of the icon based on the at least one location along the first axis or the at least one location along the second axis.

12. The method of claim 1, wherein the dataset is selected from among a plurality of datasets, and further comprising selecting the dataset based on a set of predetermined criteria.

13. The method of claim 12, wherein at least one of the predetermined criteria was defined by a user.

14. A system for visually displaying comparisons of dataset components, the system comprising:
   a user interface that receives imported information regarding a dataset comprising a plurality of components, each component corresponding to a data subset that includes function data and historic data;
   a communication interface that searches one or more databases over a communication network, wherein database search results include at least one alternative component for each component of the dataset based on the function data, wherein each alternative component is associated with a replicability metric based on an identified similarity of function data to the function data of the respective component of the dataset;
   a processor that executes instructions stored in memory to:
      filter the components based on a replicability metric threshold, wherein one or more of the components having a replicability metric below the replicability metric threshold are excluded from further analysis,
      identify at least one location along a first axis based on the filtered components,
      identify at least one location along an x-axis by generating a historic metric for each of the filtered components, wherein the historic metric is based on a comparison of historic data of the respective filtered component against historic data of the at least one identified alternative component, and wherein the at least one location along the x-axis is based on the historic metric; and generate a visual display within a graphical user interface, wherein the visual display charts the historic metric of each of the filtered components against the replicability metric of each of the filtered components, the visual display including an icon corresponding to each filtered component and plotted at the at least one location along the first axis and the at least one location along the second axis, wherein a size of the icon corresponds to a size associated with the respective filtered component relative to a size associated with the dataset, and wherein the filtered components having a replicability metric above the replicability metric threshold are illustrated in the visual display in accordance with the filtering; and a screen that displays the generated visual display within the graphical user interface.

15. The system of claim 14, wherein the processor executes further instructions to identify a component among the plurality of components to replace based on a location of the corresponding icon within the visual display, wherein the visual display includes an option to replace the identified component.

16. The system of claim 15, wherein the processor executes further instructions to make a suggestion regarding replacement of the identified component based on a corresponding alternative component among the database search results.

17. The system of claim 16, wherein the processor executes further instructions to extract a plurality of metrics regarding the dataset, and to construct a new dataset that matches the extracted plurality of metrics regarding the historic data and replicability of the function data.

18. The system of claim 16, wherein the user interface further receives input electing the option to replace the identified component with the alternative component, wherein implementing the elected replacement comprises automatically replacing the identified component with the alternative component in accordance with the received input.

19. The system of claim 16, wherein the visual display includes an option to place the identified component on a watch list, and wherein the user interface further receives input electing the option to add an alternative component to the identified component to the watch list.

20. The system of claim 19, wherein the memory further stores a trigger specifying one or more conditions for replacing the identified component with the added alternative component on the watch list, and the processor automatically initiates the replacement when the specified conditions are identified as having been met.

21. A non-transitory computer-readable storage medium, having embodied thereon a program executable by a processor to perform a method for visually displaying comparisons of dataset components, the method comprising:

receiving imported information via a user interface regarding a dataset comprising a plurality of components, each component corresponding to a data subset that includes function data and historic data;

searching one or more databases accessible over a communication network, wherein database search results include at least one alternative component for each component of the dataset based on the function data, wherein each alternative component is associated with a replicability metric based on an identified similarity of function data to the function data of the respective component of the dataset;

filtering the components based on a replicability metric threshold, wherein one or more of the components having a replicability metric below the replicability metric threshold are excluded from further analysis;

identifying at least one location along a first axis based on the filtered components;

identifying at least one location along an x-axis by generating a historic metric for each of the filtered components, wherein the historic metric is based on a comparison of historic data of the respective filtered component against historic data of the at least one identified alternative component, and wherein the at least one location along the x-axis is based on the performance metric; and generating a visual display within a graphical user interface, wherein the visual display charts the historic metric of each of the filtered components against the replicability metric of each of the filtered components, the visual display including an icon corresponding to each filtered component and plotted at the at least one location along the first axis and the at least one location along the second axis, wherein a size of the icon corresponds to a size associated with the respective filtered component relative to a size associated with the dataset, and wherein the filtered components having a replicability metric above the replicability metric threshold are illustrated in the visual display in accordance with the filtering.

* * * * *